UNITED STATES PATENT OFFICE.

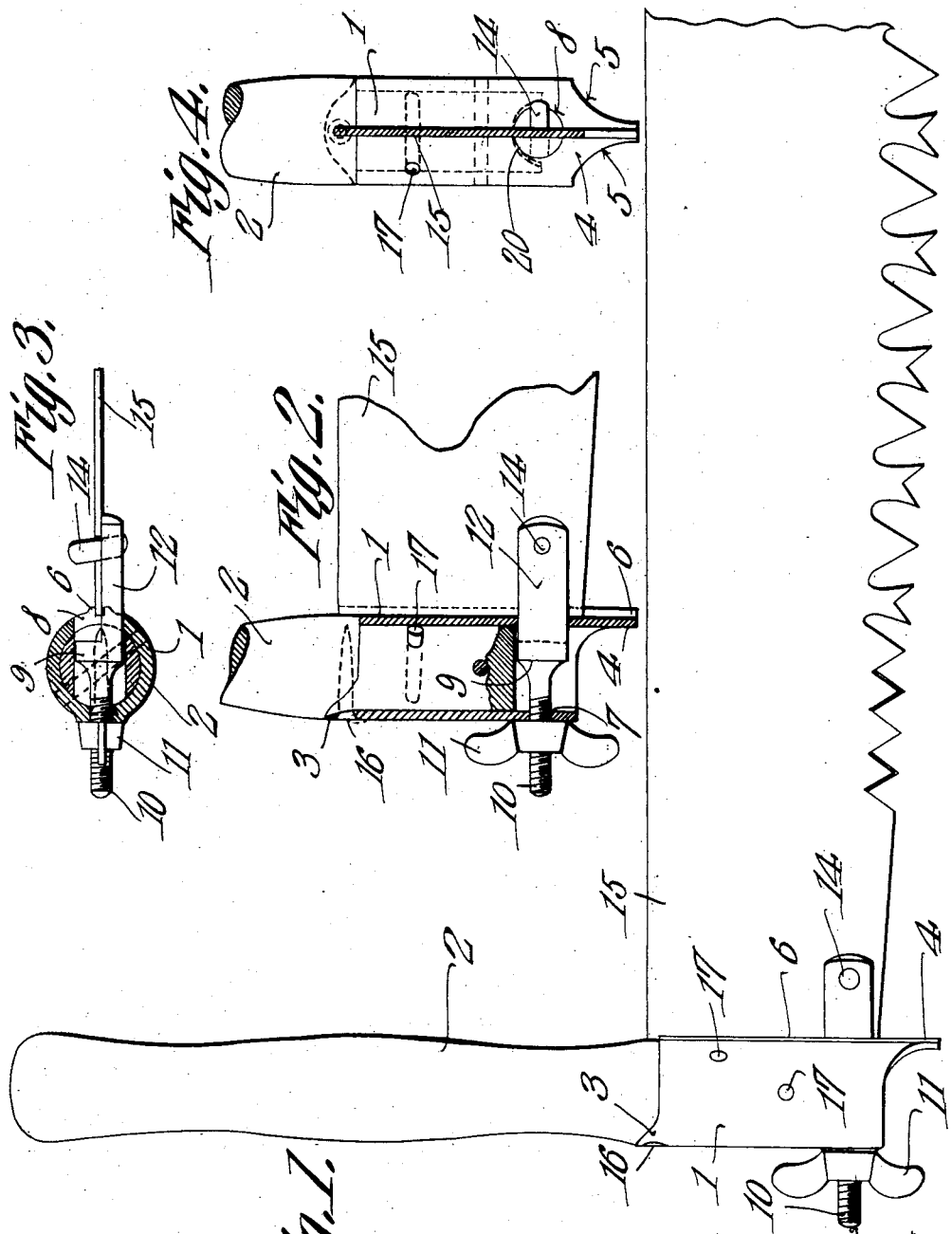

EZRA BURT OLSON, OF CROSS FORK, PENNSYLVANIA.

SAW-HANDLE.

982,986. Specification of Letters Patent. Patented Jan. 31, 1911.

Application filed April 14, 1909. Serial No. 489,852.

*To all whom it may concern:*

Be it known that I, EZRA B. OLSON, a citizen of the United States, residing at Cross Fork, in the county of Potter and State of Pennsylvania, have invented a new and useful Saw-Handle, of which the following is a specification.

The objects of the invention are the provision of novel means for reinforcing the handle of the saw and the socket by which it is received, to bear the increased strain imposed thereon by the earth-engaging means; the provision of novel means for assembling the saw with the socket; other and further objects being made manifest hereinafter as the description of the invention progresses.

The invention consists in the novel construction and arrangement of parts hereinafter described.

In the accompanying drawings:—Figure 1 shows my invention in side elevation; Fig. 2 is a side elevation upon an enlarged scale, parts being broken away, and sectioned, better to illustrate the structure; Fig. 3 is a transverse section; Fig. 4 is an end elevation, looking upon the inner end of the device.

In the following description that portion of the device which is adjacent the saw will be denominated as the "inner" portion, and that portion of the device which is away from the saw and adjacent the sawyer, when the device is in use, will be denominated as the "outer" portion thereof.

In carrying out my invention, I provide, primarily, an upright tubular socket 1, designed to receive the handle 2, and having means adapted to receive and retain, one terminal of an ordinary cross-cut saw 15. The socket 1 is formed upon its inner side and at its lower edge, with a depending lug 4, which is positioned in the path of the teeth of the saw 15, and adapted to sweep the earth out of the way, when the saw is being operated in close relation to the surface of the earth. This lug 4 is preferably disposed in close relation to the end of the saw 15, in order that, after the said lug 4 has swept away the earth, the smallest possible opportunity may be afforded for the loosened earth to slide or work backward into the path of the saw. The lug 4 is disposed transversely of the path in which the saw moves, and is tapered upon its edges.

I have provided the socket 1, at its outer side, and upon its upper edge, with an upstanding lip 3. This lip 3 is adapted to receive the handle 2 and to brace the same, the said handle being chambered, as best shown in Fig. 2, to receive the thinned upper edge of the lip 3, so that the said handle 2 and the lip 3 may present a flush surface which will not catch or injure the hand of the sawyer.

The saw 15 may be assembled with the socket 1 in a variety of ways. In the present instance, I have grooved the socket 1 longitudinally, upon its inner side, and disposed, upon either side of this groove, ribs 6 extending downward along the inner face of the lug 4. The wall of the socket 1, at its outer side, is provided with an aperture 7, and, at its inner side, with an aperture 8, the aperture 8 being somewhat larger in diameter than the aperture 7. As shown to best advantage in Figs. 3 and 4, this aperture 8 intersects the ribs 6, so that one portion of the said ribs is disposed above the aperture 8, and the other portion thereof disposed below the said aperture.

The specific means whereby the saw 15 is connected to the socket 1 comprise a clamping member consisting of a head 9, adapted to register in the opening 8 in the inner wall of the socket. A shank 10 projects from the head 9 and is adapted to extend outward through the aperture 7 in the socket. The shank, at its outer extremity, is threaded to receive a wing-nut 11. The head 9 is cut away diametrically for a portion of its length, to form an arm 12, which is substantially semi-circular in transverse section. The flat face of this arm 12 is disposed in substantial alinement with one side of the groove which is defined by the ribs 6, and is provided with an outstanding pin 14, which is slightly inclined toward the socket 1, in order to receive and firmly to hold the saw 15, which is mounted thereon, the extremity of the saw being disposed upon the flat face of the arm 12, and terminally seated between the ribs 6, it being easily discernible, from the drawings, that a rotation of the wing-nut 11 upon the shank 10 will seat the saw 15 firmly between the ribs. The lower extremity of the handle 2 is cut away diametrically upon its lower face and grooved across its lower end as at 20 to accommodate the head 9. The handle is attached to the socket 1 by means of a pin 16, which is passed through the lip 3, and, by other pins 17 located at convenient and suitable points in the socket and at angles to the pin 16 so that they will not split the handle. The latter partly surrounds the clamping member, as seen in Fig. 4, and hence when the wing nut is tightened the socket will not be crushed.

Having thus described my invention, what I claim as new, and desire to protect, by Letters Patent, is:—

A tubular socket for a saw handle having at its outer side and upon its upper edge an upstanding lip, and at its inner side and upon its lower edge, diagonal to the lip, a depending earth-engaging lug disposed in the path of the saw, and a handle inserted in the socket and provided with a recess to receive the lip to permit it to lie flush with the handle, the lip serving to reinforce the socket against the strains resulting from the contact of the lug with the earth.

In testimony that I claim the foregoing as my own, I have hereto affixed my signature in the presence of two witnesses.

EZRA BURT OLSON.

Witnesses:
  IRVING S. DUREN,
  OWEN O. GALLUP.